US011494796B2

(12) United States Patent
Rakshit et al.

(10) Patent No.: US 11,494,796 B2
(45) Date of Patent: Nov. 8, 2022

(54) CONTEXT AWARE GAMIFICATION IN RETAIL ENVIRONMENTS

(71) Applicant: International Business Machines Corporation, Armonk, NY (US)

(72) Inventors: Sarbajit K. Rakshit, Kolkata (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/012,131

(22) Filed: Sep. 4, 2020

(65) Prior Publication Data

US 2022/0076286 A1   Mar. 10, 2022

(51) Int. Cl.
G06Q 30/02 (2012.01)
H04W 4/021 (2018.01)
G06T 19/00 (2011.01)

(52) U.S. Cl.
CPC ..... *G06Q 30/0209* (2013.01); *G06Q 30/0211* (2013.01); *G06T 19/006* (2013.01); *H04W 4/021* (2013.01)

(58) Field of Classification Search
None
See application file for complete search history.

(56) References Cited

U.S. PATENT DOCUMENTS 8,606,645 B1 * 12/2013 Applefeld ............. G06Q 30/02
705/26.1
9,082,149 B2    7/2015 Argue
10,664,863 B1 *  5/2020 Mishra ................ G06Q 30/0277
11,057,751 B1 *  7/2021 Niranjayan ........... H04W 4/027
2009/0083122 A1 *  3/2009 Angell ................ G06Q 30/0204
705/7.33
2013/0155107 A1 *  6/2013 Ashour .............. H04N 1/00342
345/633

(Continued)

FOREIGN PATENT DOCUMENTS

CN       108362279 A    8/2018

OTHER PUBLICATIONS

User Perception on Mobile Augmented Reality as a Marketing Tool, Irshad et al., 2016 3rd International Conference On Computer And Information Sciences (ICCOINS).*

(Continued)

*Primary Examiner* — David J Stoltenberg
(74) *Attorney, Agent, or Firm* — Edward J. Wixted, III (57) ABSTRACT

A tool for context aware gamification in retail environments. The tool determines real-time contextual data for a retail environment. The tool determines, based, at least in part, on the real-time contextual data, one or more customers associated with a target location within the retail environment. The tool provides a gaming incentive through an associated augmented reality experience to the one or more customers associated with the target location, wherein the gaming incentive incentivizes movement of the one or more customers with respect to the target location. Responsive to a determination that the gaming incentive is not effective, the tool updates the gaming incentive and the associated augmented reality experience provided to the one or more customers associated with the target location.

20 Claims, 3 Drawing Sheets

(56) References Cited

U.S. PATENT DOCUMENTS

| | | | |
|---|---|---|---|
| 2013/0218721 A1* | 8/2013 | Borhan | G06Q 20/3224 705/26.41 |
| 2013/0282454 A1* | 10/2013 | Alpert | G06Q 30/0209 705/14.12 |
| 2014/0004940 A1* | 1/2014 | Wissner-Gross | A63F 13/5378 463/31 |
| 2014/0100994 A1* | 4/2014 | Tatzel | G06Q 30/0276 705/27.1 |
| 2014/0171039 A1* | 6/2014 | Bjontegard | H04L 67/38 455/414.1 |
| 2014/0310056 A1* | 10/2014 | Alapati | G06K 9/00671 705/7.28 |
| 2015/0170256 A1* | 6/2015 | Pettyjohn | G06F 3/04812 705/14.49 |
| 2015/0193982 A1* | 7/2015 | Mihelich | H04W 4/026 345/633 |
| 2015/0262208 A1* | 9/2015 | Bjontegard | G06Q 30/0202 705/7.31 |
| 2015/0269818 A1* | 9/2015 | Jain | G08B 13/2488 340/572.1 |
| 2015/0279081 A1* | 10/2015 | Monk | A63F 13/65 345/419 |
| 2017/0032416 A1* | 2/2017 | Soni | G06Q 30/0254 |
| 2018/0053241 A1* | 2/2018 | Haver | G06Q 30/0207 |
| 2018/0114250 A1* | 4/2018 | Phillips | G06Q 30/0261 |
| 2018/0174088 A1 | 6/2018 | Brown | |
| 2019/0022530 A1* | 1/2019 | Kornmann | G06Q 30/0207 |
| 2019/0108578 A1* | 4/2019 | Spivack | G09G 5/14 |
| 2019/0108682 A1* | 4/2019 | Spivack | G06Q 30/0273 |
| 2019/0108686 A1* | 4/2019 | Spivack | G06Q 20/123 |
| 2019/0149725 A1* | 5/2019 | Adato | H04N 1/32144 348/158 |
| 2019/0184291 A1* | 6/2019 | Patton | A63F 13/65 |
| 2019/0244436 A1* | 8/2019 | Stansell | G06T 19/20 |
| 2019/0303807 A1* | 10/2019 | Gueye | G06Q 10/02 |
| 2019/0325509 A1* | 10/2019 | Nair | G06F 16/219 |
| 2019/0394325 A1* | 12/2019 | Bjontegard | A63F 13/216 |
| 2020/0005357 A1* | 1/2020 | Kiemele | G06Q 30/0261 |
| 2020/0084605 A1* | 3/2020 | Fraccaroli | H04W 4/80 |
| 2020/0167814 A1* | 5/2020 | Rodriguez Bravo | G06Q 50/01 |
| 2020/0302380 A1* | 9/2020 | Nyswonger | G06K 7/10366 |
| 2020/0302510 A1* | 9/2020 | Chachek | G06K 9/00671 |
| 2020/0302721 A1* | 9/2020 | Koo | H04B 10/1149 |

OTHER PUBLICATIONS

Ubitem: A Framework for Interactive Marketing in Location-Based Gaming Environment, Han et al., Proceedings of the International Conference on Mobile Business (ICMB'05) 0-7695-2367-6/05 $20.00 © 2005.*

Distributed Aisle-Level Scanning Approach for RFID Shopping Systems, Karmouche et al., 2014 International Conference on Logistics and Operations Management (GOL).*

Bringing Online Shopping Experience to Offline Retail through Augmented Reality and RFID, Rashid et al., 2015 5th International Conference on the Internet of Things (IoT).*

Mobile Augmented Reality Survey: From Where We Are to Where We Go, Chatzopoulos et al., Digital Object Identifier 10.1109/ACCESS.2017.2698164, vol. 5, 2017.*

ShopAssist—A Unified Location-Aware System for Shopping, Lopes et al., 978-1-5090-3608-0/16/$31.00 c⬧ 2016 IEEE.*

Augmented Reality Based Smart Supermarket System with Indoor Navigation using Beacon Technology (Easy Shopping Android Mobile App), Jayananda et al., 978-1-5386-9418-3 2018 IEEE.*

"Let's Play Shopping! Why use Gamification in eCommerce?", 4 pages, retrieved from the Internet on Jan. 22, 2020, <https://www.newgenapps.com/blog/why-how-use-gamification-in-commerce-need-examples>.

"Virtual Reality, Augmented Reality and Gamification in Retail", MannequinMall, Jul. 1, 2016, 10 pages, <https://mannequinmall.com/blogs/posts/virtual-reality-augmented-reality-and-gamification-in-retail>.

Chou, Yu-Kai, "Gamification & Behavioral Design—Top 10 eCommerce Gamification Examples that will Revolutionize Shopping", retrieved from the Internet on Jan. 22, 2020, 23 pages, <https://yukaichou.com/gamification-examples/top-10-ecommerce-gamification-examples-revolutionize-shopping/>.

Gatta et al., "A Gamification approach to promote positive behaviours in Urban Logistics", Conference Paper—Oct. 2015, URBE 2015, URban freight and BEhavior change, 15 pages, <https://www.researchgate.net/publication/282609851>.

Ufford, Lauren, "6 Examples of Retail Gamification to Boost Engagement and Sales", May 24, 2017, Shopify Blogs, 13 pages, <https://www.shopify.com/retail/6-examples-of-retail-gamification-to-boost-engagement-and-sales>.

* cited by examiner

CONTEXT AWARE GAMIFICATION IN RETAIL ENVIRONMENTS

BACKGROUND OF THE INVENTION

The present invention relates generally to cognitive computing systems, and more particularly to machine learning for context aware gamification in retail environments.

Gamification is the application of game design elements and game principles in non-game contexts. Gamification can also be defined as a set of activities and processes to solve problems by utilizing and applying the characteristics of game elements to certain situations and experiences. Further, gamification commonly employs game design elements to improve user engagement, organizational productivity, and usefulness of systems, etc. Much of the research related to gamification suggests it can have positive effects on individuals and outcomes.

SUMMARY

Aspects of an embodiment of the present invention disclose a method, a computer system and a computer program product for context aware gamification in retail environments. The method includes determining, by one or more computer processors, real-time contextual data for a retail environment. The method further includes determining, by the one or more computer processors, based, at least in part, on the real-time contextual data, one or more customers associated with a target location within the retail environment. The method further includes providing, by the one or more computer processors, a gaming incentive through an associated augmented reality experience to the one or more customers associated with the target location, wherein the gaming incentive incentivizes movement of the one or more customers with respect to the target location. The method further includes, responsive to a determination that the gaming incentive is not effective, updating, by the one or more computer processors, the gaming incentive and the associated augmented reality experience provided to the one or more customers associated with the target location.

DETAILED DESCRIPTION

Embodiments of the present invention recognize that in retail environments, customers often select products from various different product shelves while shopping, and therefore customers are equally moving around a retail space from shelf to shelf. As such, embodiments of the present invention recognize that multiple customers shopping for the same product may accumulate in the same retail space, which can result in crowding and high customer density in certain areas of the retail space. Embodiments of the present invention further recognize that crowding and high customer density in a retail space may affect the speed and ease with which a customer can select a product from shelves in these particular areas of the retail space. Embodiments of the present invention further recognize that there exists an opportunity to leverage gamification in a retail environment to incentivize intelligent organization of customers, and effectively manage overcrowding by balancing customer shopping load across the retail environment.

Embodiments of the present invention provide the capability to balance customer shopping load across a retail environment during overcrowding situations by incentivizing customers in target locations to disperse to less crowded areas in the retail environment, thereby facilitating a comfortable shopping experience for each customer in the retail environment. Embodiments of the present invention further provide the capability to dynamically create a gamification shopping experience for select customers in a retail environment that encourages customer dispersal to areas of the retail environment having a lower customer density to mitigate congestion and promote a more enjoyable shopping experience.

Embodiments of the present invention provide an improvement to cognitive computing and machine-based learning technology as it relates to managing shopping load and customer density in a retail environment. Embodiments of the present invention provide an improvement to the above referenced technology by creating a gamification experience through an augmented reality device to influence customer densities, movement patterns, and customer locations within a retail environment. Embodiments of the present invention further provide an improvement to the above referenced technology by utilizing the gamification experience to incentivize customers to adopt movement patterns and seek locations within a retail environment that promote a balanced and efficient shopping load. Embodiments of the present invention further provide an improvement to the above referenced technology by integrating the use of a gamification experience through an augmented reality device in the retail environment to actively track customer densities, movement patterns, and customer locations, and dynamically provide gaming incentives to customers that promote a balanced shopping load across the retail environment. Embodiments of the present invention further provide an improvement to the above referenced technology by integrating the use of a gamification experience through an augmented reality device in the retail environment to provide retailers with an efficient computing system to manage space and product layout within a retail environment.

The inventors have further observed and/or recognized that introducing gamification into a retail environment provides a mechanism to influence mobility patterns for customers in the retail environment and effectively manage customer shopping load in a given area of the retail space.

The inventors have further observed and/or recognized that introducing gamification into a retail environment provides the capability to influence decision-making for customers, optimize a time required for a customer to shop for products on a shopping list, and facilitate greater customer satisfaction with product selection and purchases.

Implementation of such embodiments may take a variety of forms, and exemplary implementation details are discussed subsequently with reference to the Figures.

Figure 1:
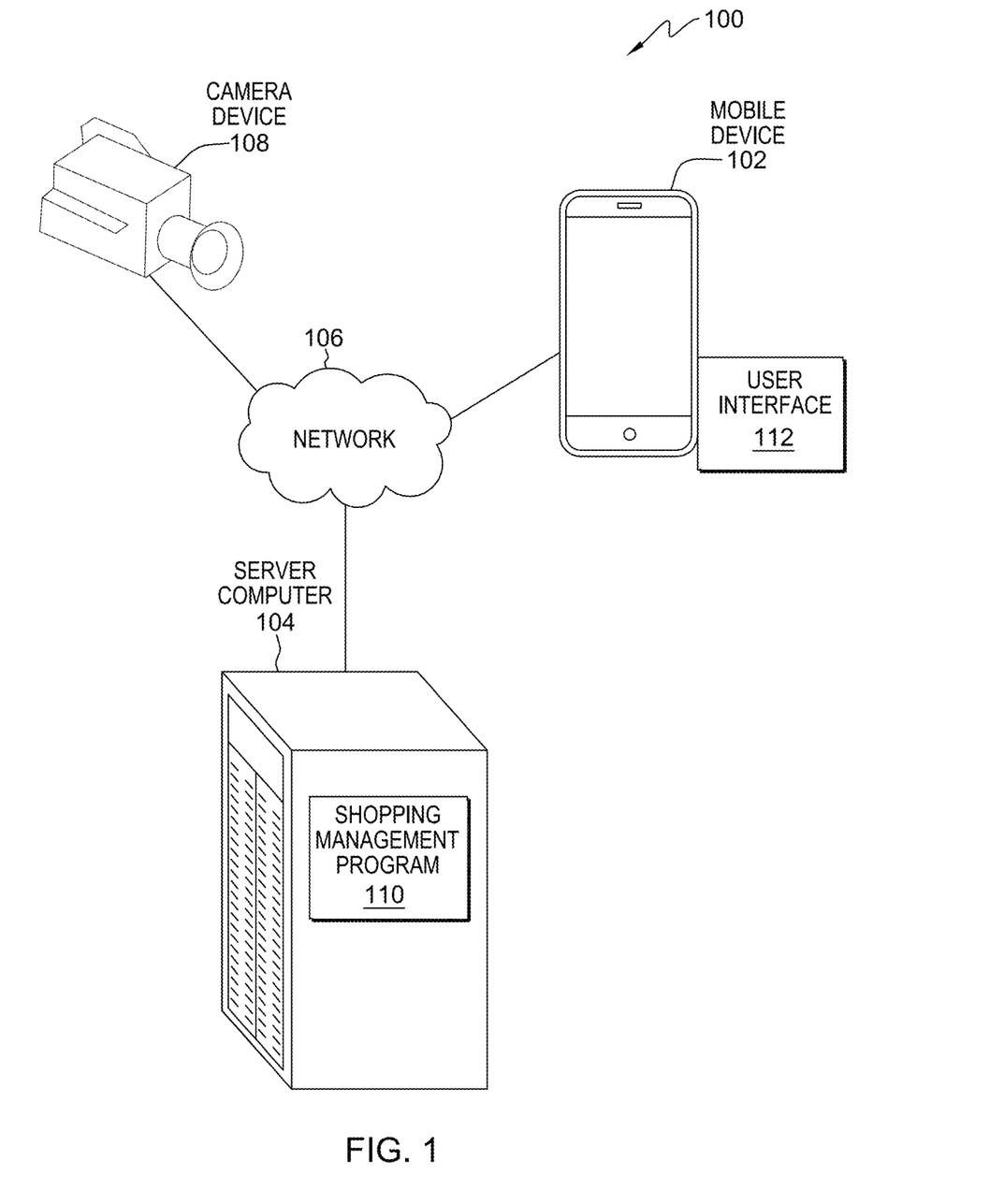
FIG. 1 is a functional block diagram illustrating a data processing environment suitable for operation of a shopping management program, in accordance with an embodiment of the present invention.

Referring now to various embodiments of the invention in more detail, FIG. 1 is a functional block diagram of a distributed data processing environment, generally designated 100, suitable for operation of a shopping management program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 102, server computer 104, and camera device 108, all interconnected over network 106. Network 106 can be, for example, a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 may be any combination of connections and protocols that will support communications between mobile device 102, server computer 104, and camera device 108, as well as other computing devices (not shown) within distributed data processing environment 100. FIG. 1 is intended as an example and not as an architectural limitation for the different embodiments.

In one embodiment, mobile device 102 may be a laptop computer, tablet computer, smartphone, smartwatch, or any programmable electronic device capable of communicating with various components and devices within distributed data processing environment 100, via network 106. In general, mobile device 102 may represent any programmable electronic device or combination of programmable electronic devices capable of executing machine readable program instructions and communicating with other computing devices (not shown) within distributed data processing environment 100 via a network, such as network 106. More specifically, mobile device 102 represents any device capable of sending and receiving signals, monitoring data, and analyzing data. In another embodiment, mobile device 102 may represent a sensor, or a collection of connected sensors (i.e., paired smart watch, heart monitor and any other wearable electronic device, etc.), capable of sending and receiving signals, monitoring data, and analyzing data related to physical conditions of a customer. In one embodiment, mobile device 102 may be an augmented reality device capable of providing a virtual reality experience. In one embodiment, mobile device 102 may be a smartphone having one or more cameras capable of capturing real-time video and images within a retail environment, such that a user can utilize the smartphone to participate in a virtual reality (VR) experience provided by a software application, such as shopping management program 110. In one embodiment, mobile device 102 may be any electronic device capable of executing an application supporting context aware gamification in retail environments, as discussed below. In one embodiment, mobile device 102 may be any electronic device capable of receiving notifications, alerts, incentives, etc. In one embodiment, mobile device 102 may be any electronic device with a camera and display capable of providing a virtual reality experience. In one embodiment, mobile device 102 is capable of communicating with server computer 104 and shopping management program 110. In one embodiment, mobile device 102 is a global positioning system (GPS) enabled mobile device capable of tracking and transmitting location information for a customer within a retail environment. In one embodiment, mobile device 102 may include application software that supports functionality provided by shopping management program 110, or acts as an agent application for shopping management program 110. In one embodiment, mobile device 102 includes user interface 112.

In one embodiment, user interface 112 provides an interface between a user of mobile device 102 and server computer 104. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software that provides an interface between a user of mobile device 102, server computer 104, and shopping management program 110. Mobile application software, or an "app," is a computer program that runs on smartphones, tablet computers, smartwatches and any other mobile devices.

In one embodiment, server computer 104 can be a stand-alone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In an embodiment, server computer 104 represents a computing system utilizing clustered computers and components (e.g., database server computers, application server computers, etc.) that act as a single pool of seamless resources when accessed within distributed data processing environment 100. Server computer 104 includes shopping management program 110 communicatively coupled to server computer 104, and facilitates communication between shopping management program 110, mobile device 102, and camera device 108. Server computer 104 may include internal and external hardware components, as depicted and described in further detail with respect to FIG. 3.

In one embodiment, shopping management program 110 operates on a central server, such as server computer 104 and may be utilized by one or more mobile devices, such as mobile device 102, via network 106. In another embodiment, shopping management program 110 may be a program downloaded from the central server or a third-party provider (not shown), and executed on a mobile device, such as mobile device 102, for providing context aware gamification in retail environments. In another embodiment, shopping management program 110 may be a program, downloaded from a central server, such as server computer 104 and installed on one or more mobile devices, such as mobile device 102. In yet another embodiment, shopping management program 110 may be utilized as a software service provided by a third-party cloud service provider (not shown). In yet another embodiment, shopping management program 110 may include one or more components, such as add-ons, plug-ins, and agent programs, etc., installed on one or more mobile devices, such as mobile device 102, to track movement patterns customers, customer shopping lists, product searches, etc., and provide gaming incentives, augmented reality experiences, and notifications to a customer in a retail environment.

In one embodiment, shopping management program 110 is a program for providing the capability to balance customer shopping load across a retail environment during overcrowding situations by incentivizing customers in target locations to disperse to less crowded areas in the retail environment. In one embodiment, shopping management program 110 provides the capability to dynamically create a context aware gamification shopping experience for select customers in a retail environment that encourages customer dispersal to areas of the retail environment having a lower customer density. In one embodiment, shopping management program 110 provides an augmented reality context aware gamification experience to customers in a retail environment, where the context aware gamification experience analyzes various customer data, such as real-time shopping lists for a customer, historical shopping behaviors of the customer, relative position of the customers to each other within the retail environment, location of products within the retail environment, and real-time location of each customer within the retail environment, to develop a robust contextual dataset from which to generate incentives to provide to select customers. For example, while shopping in a retail environment where many customers are present in a given location, shopping management program 110 may, based on a shopping list of the customers, and a number of people present in the given location, identify a number of customers that can comfortably be shopping for products in any area, and any additional customers will be proactively targeted and offered a gaming incentive, enticing them to interact in a gamification experience, to prevent customer overcrowding in the given location.

In one embodiment, camera device 108 is a closed feed digital video camera in a retail environment capable of monitoring customer movement patterns and density in one or more locations of the retail environment (i.e., retail space, sales floor, shopping center, showroom, etc.). In one embodiment, camera device 108 is a digital video camera capable of capturing images of customers in a retail environment, and transmitting the images to a server computer, such as server computer 104, to be utilized by a software program, such as shopping management program 110. In one embodiment, camera device 108 may be a digital video camera coupled with or interconnected with one or more sensors, such as motion sensors, radio frequency identification sensors (RFID), thermal sensors, etc., which can be used to identify a real-time position of a customer in a retail space. In one embodiment, camera device 108 may be a digital video camera coupled or interconnected with one or more sensors, such as motion sensors, radio frequency identification sensors (RFID), thermal sensors, etc., which can be used to identify a real-time location of products in a retail environment, as well as a current inventory (i.e., real-time stock) of the products in the retail environment.

Figure 2:
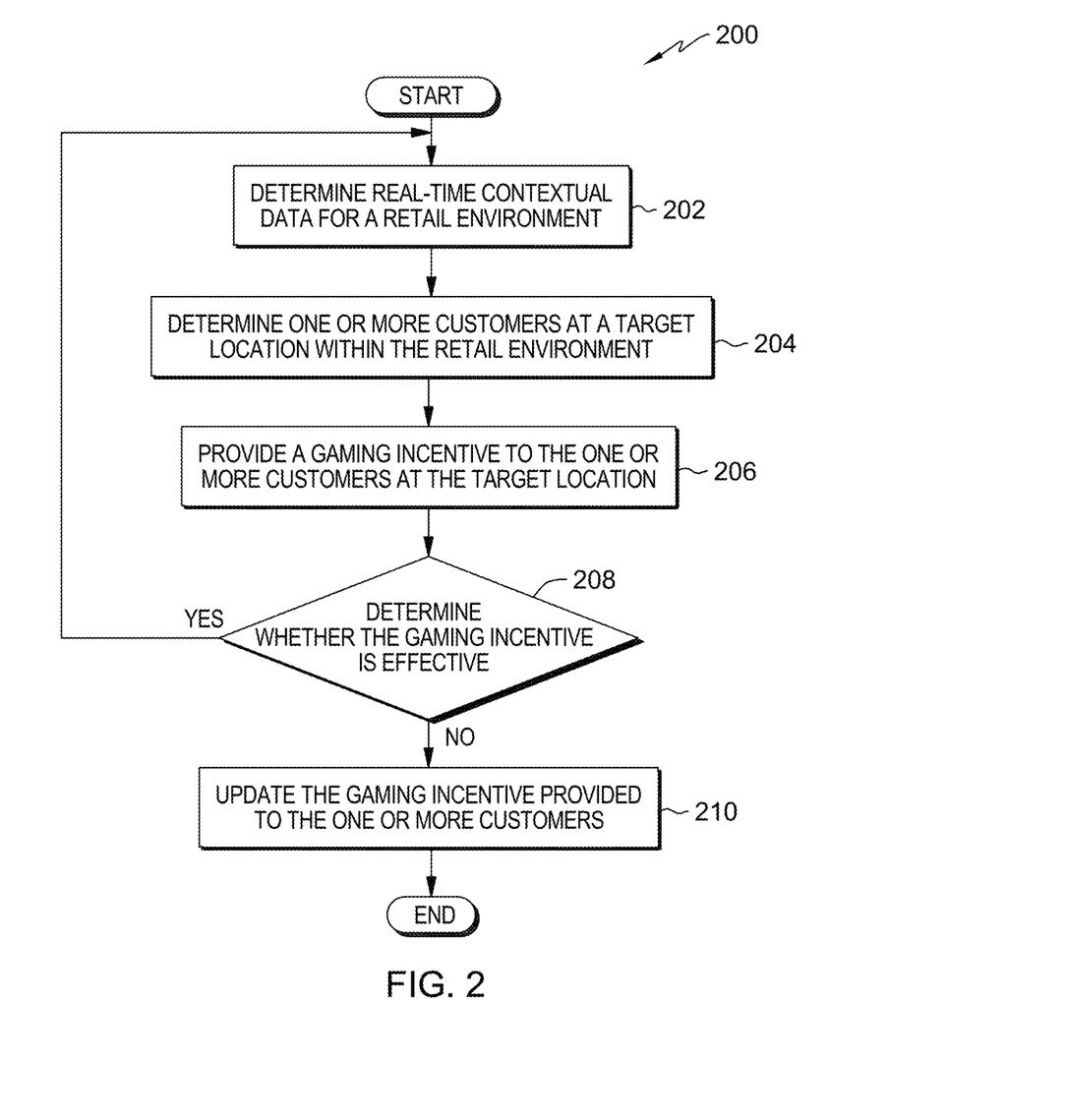
FIG. 2 is a flowchart depicting operational steps of a shopping management program, in accordance with an embodiment of the present invention.

FIG. 2 depicts a flowchart of operational steps of a shopping management program, such as shopping management program 110 of FIG. 1, generally designated 200, for context aware gamification in a retail environment, in accordance with an embodiment of the present invention.

Shopping management program 110 determines real-time contextual data for a retail environment (202). In one embodiment, shopping management program 110 determines real-time contextual data for a retail environment, where the real-time contextual data for the retail environment includes at least customer data, product data, and customer density data within the retail environment. For example, customer data may include real-time shopping lists for a customer and historical shopping behaviors of the customer, customer density data may include relative position of the customers to each other within the retail environment and a real-time location of each customer within the retail environment, and product related data may include a location for products within the retail environment, a level of interest in a product, and quantity and pricing for a product. In one embodiment, shopping management program 110 determines real-time contextual data for a retail environment by accessing and analyzing a camera feed within the retail environment to determine a number of customers at one or more locations throughout the retail environment. In one embodiment, shopping management program 110 accesses and analyzes the camera feed and one or more sensors to determine a real-time product inventory across one or more display units (e.g., product shelves, display cases, etc.). For example, shopping management program 110 may access a camera feed from a camera, such as camera device 108, and one or more sensors of a retail environment to determine a real-time number of products and a location for the products within the retail environment utilizing a combination of RFID tags and image recognition software. Further, shopping management program 110 may access a camera feed and one or more sensors of a retail environment to determine a real-time number of customers within the retail environment utilizing a combination of at least GPS data from a mobile device of a customer, image recognition software, and one or more motion sensors (e.g., entrance/exit door motion sensors).

In one embodiment, shopping management program 110 determines real-time contextual data for the retail environment by monitoring customer density and customer positioning in the retail environment. In one embodiment, shopping management program 110 monitors customer density and customer positioning in the retail environment relative to the real-time contextual data to identify a mobility pattern for a plurality of customers within the retail environment, a customer density value for one or more locations within the retail environment, and customer positioning value within the retail environment. In one embodiment, shopping management program 110 monitors customer density in the retail environment dynamically by identifying customers that have recently entered the retail environment, identifying customers that have recently arrived at a specific location within the retail environment (e.g., a particular product shelf, a particular shopping area or department, etc.), and customers that have recently departed from a specific location within the retail environment. In one embodiment, the customer density value is a number of people located in a specific location at any given point and time, and the customer density value is able to function as a threshold value, such that a customer density greater than the customer density value is determined to be crowded, and a customer density less than customer density value is determined to be not crowded. In one embodiment, the mobility pattern for the plurality of customers is a pattern of movement throughout the retail environment used by the plurality of customers, and can include customer flow through aisles, departments, structure levels, stairwells, elevators, escalators, etc. In one embodiment, the customer positioning value is an indicator of one or more locations within the retail environment that are of high interest to the one or more customers. In one embodiment, shopping management program 110 utilizes customer density information, mobility patterns, the customer density value, and customer positioning data to generate a context aware gamification experience for customers in the retail environment that influences mobility patterns and controls the customer density value within the retail environment.

Shopping management program 110 determines one or more customers at a target location within the retail environment (204). In one embodiment, shopping management program 110 determines one or more customers at a target location within the retail environment based, at least in part, on the real-time contextual data for the retail environment. In one embodiment, a target location is any location within the retail environment determined to be overcrowded. In another embodiment, the target location can be a location within the retail environment that is in proximity to a second location, where the second location is a location that can benefit from having an increased number of customers (e.g., food court). For example, where the customer density at a first location (i.e., target location) in the retail environment is high (i.e., above a pre-determined customer density value threshold), shopping management program 110 may determine to distribute one or more customers to a second location within the retail environment to balance the shopping load to mitigate overcrowding at the first location. In another example, where the customer density (e.g., customer density value) at a first location in the retail environment is low (i.e., at or below a pre-determined customer density value threshold), shopping management program 110 may determine to attract one or more customers at a second location to the first location. In yet another example, where a customer representative at a first location is not able to address the customers currently at the first location, shopping management program 110 may determine to attract one or more customers at the first location to a second location within the retail environment to balance the shopping load.

In one embodiment, shopping management program 110 determines one or more customers at a target location within the retail environment by identifying one or more customers that could be diverted or temporarily moved to another location within the retail environment to reduce the shopping load or draw attention to a new product that has arrived. In one embodiment, shopping management program 110 identifies customers that have already purchased products from the target location, identifies customers that have spent more than a threshold amount of time in the target location, identifies customers that are about to arrive at the target location, which is already determined to be crowded, and identifies customers that are spending time in the target location, but have not selected any product for purchase, etc. In one embodiment, shopping management program 110 determines the one or more customers in the target location based, at least in part, on a customer profile (including product search history, product purchase history, reviews, social media, rea-time shopping lists, etc.) and an expected level of interest in a gaming incentive (other shopping applications on a mobile device, games on a mobile device, previous purchases made after incentives/awards, etc.), which are factors that indicate a likelihood of being influenced by a gaming incentive.

Shopping management program 110 provides a gaming incentive to the one or more customers at the target location (206). In one embodiment, shopping management program 110 provides a gaming incentive to the one or more customers at the target location by generating a custom gaming incentive for each of the one or more customers based, at least in part, on the customer profile, an expected level of interest in a gaming incentive, and the real-time contextual data for the retail environment. For example, shopping management program may dynamically generate a personalized gaming incentive to a customer at a target location in a retail environment that entices the customer to disperse from the target location to a second location in the retail environment, such as a product discount for a new product found at the second location within the retail environment. In one embodiment, the gaming incentive can be an augmented reality (AR) treasure hunt game, where a customer can participate in challenges (e.g., find one or more products, purchase a predetermined number of products, spend a predetermined amount of time shopping in a specific location within the retail environment, review a new product at a specific location in the retail environment, etc.) to win awards (e.g., coupons, discounts, deals, free merchandise, shopping club points, etc.). In one embodiment, shopping management program 110 provides the gaming incentive and associated augmented reality experience to the one or more customers on a mobile device, such as mobile device 102. In an alternative embodiment, shopping management program 110 provides the gaming incentive and associated augmented reality experience to the one or more customers via an augmented reality device distributed to each of the one or more customers upon entering the retail environment.

Shopping management program 110 determines whether the gaming incentive is effective (decision block 208). In one embodiment, shopping management program 110 determines whether the gaming incentive is effective by determining whether the real-time customer density at the target location has been reduced below the customer density value. Where the real-time customer density is reduced below the customer density value, shopping management program 110 determines that the gaming incentive is effective. Where the real-time customer density is not reduced below the customer density value, shopping management program 110 determines that the gaming incentive is not effective. In another embodiment, shopping management program 110 determines whether the gaming incentive is effective by determining whether a real-time mobility pattern for the one or more customers at a target location has deviated from a previous mobility pattern. Where the real-time mobility pattern has deviated from the previous mobility pattern, shopping management program 110 determines that the gaming incentive is effective. Where the real-time mobility pattern has not deviated from the previous mobility pattern, shopping management program 110 determines that the gaming incentive is not effective. In yet another embodiment, shopping management program 110 determines whether the gaming incentive is effective by determining whether a new product has received increased attention (e.g., increase in purchases of the new product, increase in reviews of the new product, etc.). Where the new product has received increased attention, shopping management program 110 determines that the gaming incentive is effective. Where the new product has not received increased attention, shopping management program 110 determines that the gaming incentive is not effective.

Responsive to a determination that the gaming incentive is effective, shopping management program 110 returns to determining real-time context for the retail environment (202). In one embodiment, shopping management program 110 returns to determining real-time context for the retail environment, including monitoring customer density in the retail environment to further track changes in customer density, mobility patterns, the customer density value, and customer positioning within the retail environment. In one embodiment, shopping management program 110 returns to determining real-time context for the retail environment to dynamically and continuously monitor the real-time context for the retail environment to mitigate overcrowding and provide an efficient shopping experience for the one or more customers.

Responsive to a determination that the gaming incentive is not effective, shopping management program 110 updates the gaming incentive provided to the one or more customers (210). In one embodiment, shopping management program 110 updates the gaming incentive provided to the one or more customers by changing a custom gaming incentive or type of augmented reality experience to encourage better customer involvement while shopping in the retail environment. In one embodiment, shopping management program 110 updates the gaming incentive and associated augmented reality experience utilizing an artificial intelligence system to increase participation by the one or more customers in the retail environment in the augmented reality experience. In one embodiment, shopping management program 110 identifies real-time context of the retail environment, a previous level of interest in the gaming incentive and associated augmented reality experience for each of the one or more customers, predicted shopping lists for each of the one or more customers, and a total number of customers participating in the augmented reality experience, and generates one or more updated gaming incentives and associated augmented reality experiences to effectuate participation. For example, where a gaming incentive for shopping club points awarded during a treasure hunt augmented reality experience was not well received by customers in a target location, shopping management program 110 may update the gaming incentive to offer a discount on a new product when a second product from a second location is purchased concurrently, or update a gaming incentive to be for a discount on a product found on a current shopping list for the one or more customers.

Figure 3:
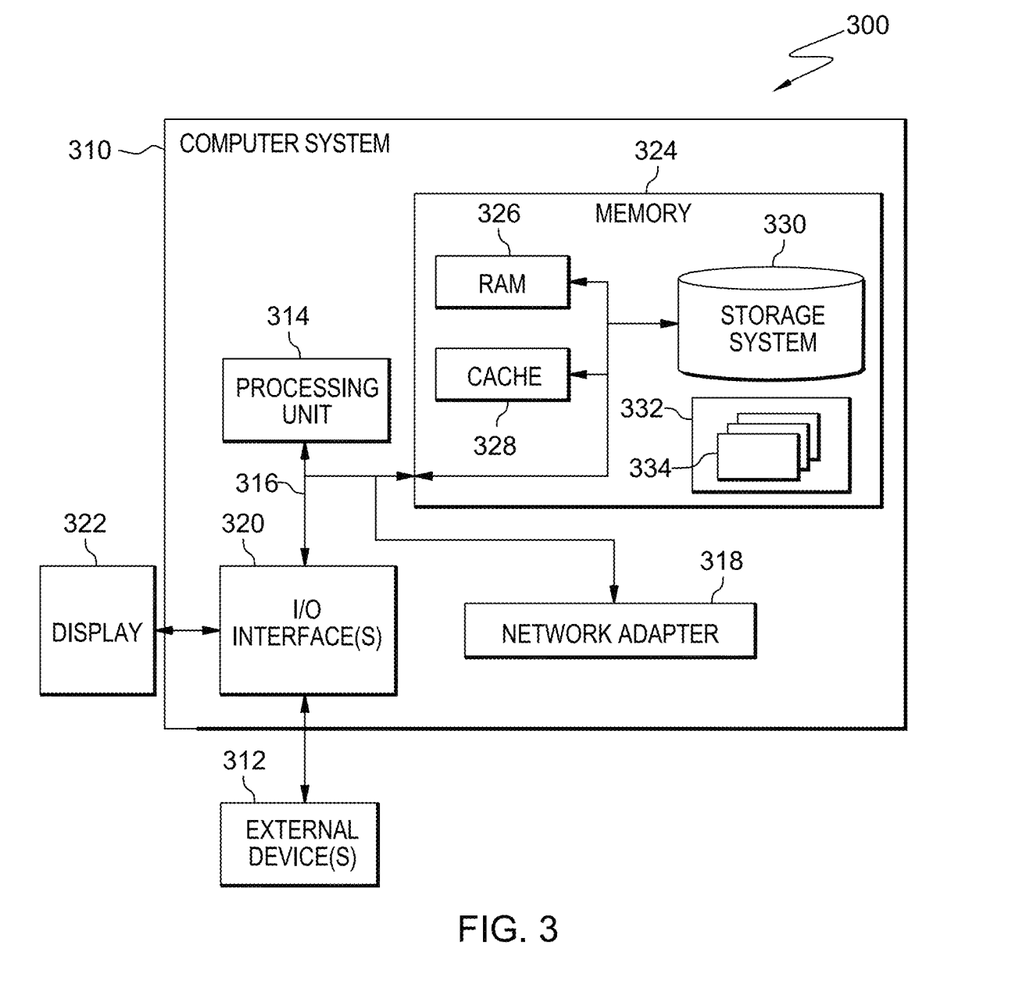
FIG. 3 is a block diagram depicting components of a data processing system (e.g., server computer of FIG. 1), in accordance with an embodiment of the present invention.

FIG. 3 depicts a block diagram of components of data processing system, such as server computer 104 of FIG. 1, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server computer 104 in distributed data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer-implemented method comprising:
   determining, by one or more computer processors, real-time contextual data for a retail environment, wherein determining the real-time contextual data includes determining a real-time product inventory within the retail environment utilizing at least one camera interconnected with a plurality of radio frequency identification (RFID) sensors;

determining, by one or more computer processors, based on the real-time contextual data, one or more customers associated with a target location within the retail environment;

providing, by one or more computer processors, a gaming incentive through an associated augmented reality experience to the one or more customers associated with the target location; and responsive to a determination that real-time customer density values have not decreased below a customer density threshold, changing, by one or more computer processors, the gaming incentive and the associated augmented reality experience provided to the one or more customers associated with the target location to a different type of gaming incentive and different type of augmented reality experience.

2. The method of claim 1, wherein the real-time contextual data for the retail environment includes at least customer data, product data, and customer density data within the retail environment.

3. The method of claim 1, wherein determining the real-time contextual data further comprises:

accessing, by one or more computer processors, a camera feed within the retail environment to determine a plurality of customers associated with one or more locations throughout the retail environment; and identifying, by one or more computer processors, a mobility pattern for the plurality of customers within the retail environment, a customer density value for the one or more locations within the retail environment, and a customer positioning value within the retail environment.

4. The method of claim 1, wherein determining the one or more customers associated with the target location further comprises:

determining, by one or more computer processors, the target location as a location within the retail environment determined to be overcrowded based on a customer density value for one or more locations within the retail environment, and a customer positioning value within the retail environment; and identifying, by one or more computer processors, each of the one or more customers associated with the target location to be diverted to a second location within the retail environment to reduce a shopping load at the target location.

5. The method of claim 4, further comprising:

identifying, by one of more computer processors, each of the one or more customers that have already purchased products from the target location, each of the one or more customers that have spent more than a threshold amount of time in the target location, each of the one or more customers that are about to arrive at the target location, wherein the target location is already determined to be overcrowded, and each of the one or more customers that are spending time in the target location, but have not selected any product for purchase; and determining, by the one or more computer processors, each of the one or more customers associated with the target location based on a customer profile and an expected level of interest in the gaming incentive.

6. The method of claim 1, further comprising:

generating, by one or more computer processors, the gaming incentive for each of the one or more customers at the target location based on a customer profile, an expected level of interest in the gaming incentive, and the real-time contextual data for the retail environment, wherein the gaming incentive is an augmented reality treasure hunt game where each of the one or more customers participate in one or more challenges to win one or more awards.

7. The method of claim 1, wherein changing the gaming incentive and the associated augmented reality experience further comprises:

identifying, by one or more computer processors, a previous level of interest in the gaming incentive and the associated augmented reality experience for each of the one or more customers, one or more predicted shopping lists for each of the one or more customers, and a total number of each of the one or more customers participating in the augmented reality experience; and generating, by the one or more computer processors, one or more different types of gaming incentives and one or more different types of associated augmented reality experiences to effectuate participation of each of the one or more customers associated with the target location.

8. A computer program product comprising:

one or more computer readable storage media and program instructions collectively stored on the one or more computer readable storage media, wherein the one or more computer readable storage media are not transitory signals per se, the stored program instructions comprising:

program instructions to determine real-time contextual data for a retail environment, wherein determining the real-time contextual data includes determining a real-time product inventory within the retail environment utilizing at least one camera interconnected with a plurality of radio frequency identification (RFID) sensors;

program instructions to determine, based on the real-time contextual data, one or more customers associated with a target location within the retail environment;

program instructions to provide a gaming incentive through an associated augmented reality experience to the one or more customers associated with the target location; and program instructions to, responsive to a determination that real-time customer density values have not decreased below a customer density threshold, change the gaming incentive and the associated augmented reality experience provided to the one or more customers associated with the target location to a different type of gaming incentive and different type of augmented reality experience.

9. The computer program product of claim 8, wherein the real-time contextual data for the retail environment includes at least customer data, product data, and customer density data within the retail environment.

10. The computer program product of claim 8, wherein the program instructions to determine the real-time contextual data further comprise:

program instructions to access a camera feed within the retail environment to determine a plurality of customers associated with one or more locations throughout the retail environment; and program instructions to identify a mobility pattern for the plurality of customers within the retail environment, a customer density value for the one or more locations within the retail environment, and a customer positioning value within the retail environment.

11. The computer program product of claim 8, wherein the program instructions to determine the one or more customers associated with the target location further comprise:
program instructions to determine the target location as a location within the retail environment determined to be overcrowded based on a customer density value for one or more locations within the retail environment, and a customer positioning value within the retail environment; and
program instructions to identify each of the one or more customers associated with the target location to be diverted to a second location within the retail environment to reduce a shopping load at the target location.

12. The computer program product of claim 11, wherein the stored program instructions further comprise:
program instructions to identify each of the one or more customers that have already purchased products from the target location, each of the one or more customers that have spent more than a threshold amount of time in the target location, each of the one or more customers that are about to arrive at the target location, wherein the target location is already determined to be overcrowded, and each of the one or more customers that are spending time in the target location, but have not selected any product for purchase; and
program instructions to determine each of the one or more customers associated with the target location based on a customer profile and an expected level of interest in the gaming incentive.

13. The computer program product of claim 8, wherein the stored program instructions further comprise:
program instructions to generate the gaming incentive for each of the one or more customers at the target location based on a customer profile, an expected level of interest in the gaming incentive, and the real-time contextual data for the retail environment, wherein the gaming incentive is an augmented reality treasure hunt game where each of the one or more customers participate in one or more challenges to win one or more awards.

14. The computer program product of claim 8, wherein the program instructions to change the gaming incentive and the associated augmented reality experience further comprise:
program instructions to identify a previous level of interest in the gaming incentive and the associated augmented reality experience for each of the one or more customers, one or more predicted shopping lists for each of the one or more customers, a total number of each of the one or more customers participating in the augmented reality experience; and
program instructions to generate one or more different types of gaming incentives and one or more different types of associated augmented reality experiences to effectuate participation of each of the one or more customers associated with the target location.

15. A computer system comprising:
one or more computer processors;
one or more computer readable storage media; and
program instructions stored on at least one of the one or more computer readable storage media for execution by at least one of the one or more computer processors, the program instructions comprising:
program instructions to determine real-time contextual data for a retail environment, wherein determining the real-time contextual data includes determining a real-time product inventory within the retail environment utilizing at least one camera interconnected with a plurality of radio frequency identification (RFID) sensors;
program instructions to determine, based on the real-time contextual data, one or more customers associated with a target location within the retail environment;
program instructions to provide a gaming incentive through an associated augmented reality experience to the one or more customers associated with the target location; and
program instructions to, responsive to a determination that real-time customer density values have not decreased below a customer density threshold, change the gaming incentive and the associated augmented reality experience provided to the one or more customers associated with the target location to a different type of gaming incentive and different type of augmented reality experience.

16. The computer system of claim 15, wherein the real-time contextual data for the retail environment includes at least customer data, product data, and customer density data within the retail environment.

17. The computer system of claim 15, wherein the program instructions to determine the real-time contextual data further comprise:
program instructions to access a camera feed within the retail environment to determine a plurality of customers associated with one or more locations throughout the retail environment; and
program instructions to identify a mobility pattern for the plurality of customers within the retail environment, a customer density value for the one or more locations within the retail environment, and a customer positioning value within the retail environment.

18. The computer system of claim 15, wherein the program instructions to determine the one or more customers at the target location further comprise:
program instructions to determine the target location as a location within the retail environment determined to be overcrowded based on a customer density value for one or more locations within the retail environment, and a customer positioning value within the retail environment; and
program instructions to identify each of the one or more customers associated with the target location to be diverted to a second location within the retail environment to reduce a shopping load at the target location.

19. The method of claim 1, wherein updating the gaming incentive and the associated augmented reality experience provided to the one or more customers associated with the target location comprises utilizing an artificial intelligence system.

20. The method of claim 1, wherein the at least one camera is further interconnected with motion sensors and thermal sensors.

* * * * *